(12) United States Patent
Ewing et al.

(10) Patent No.: US 6,196,056 B1
(45) Date of Patent: Mar. 6, 2001

(54) SYSTEM FOR DETERMINING INTEGRITY OF A GAS-SEALED COMPARTMENT

(75) Inventors: Fritz Ewing, Huntington; Stuart Linzer, Seaford, both of NY (US)

(73) Assignee: Vacuum Instrument Corp., Ronkonkoma, NY (US)

( * ) Notice: Subject to any disclaimer, the term of this patent is extended or adjusted under 35 U.S.C. 154(b) by 0 days.

(21) Appl. No.: 09/060,788

(22) Filed: Apr. 15, 1998

(51) Int. Cl.[7] .................................................. G01M 3/20
(52) U.S. Cl. ................................................ 73/40.7; 73/49.3
(58) Field of Search ...................................... 73/40.7, 49.3

(56) References Cited

U.S. PATENT DOCUMENTS

| 4,791,805 | * | 12/1988 | Gates | 73/40.7 |
| 4,862,731 | * | 9/1989 | Gates | 73/40.7 |
| 5,163,315 | * | 11/1992 | Asai et al. | 73/40.7 |
| 5,499,529 | * | 3/1996 | Kronberg et al. | 73/40.7 |

FOREIGN PATENT DOCUMENTS

| 4038266 | * | 6/1992 | (DE) | 73/40.7 |
| 691711 | * | 10/1979 | (SU) | 73/40.7 |

OTHER PUBLICATIONS

Pimenov, "An Electron–Capture Leak Tester", Defektoskopiya, No. 6, Jun. 1978, pp. 61–65.*

* cited by examiner

Primary Examiner—Daniel S. Larkin
(74) Attorney, Agent, or Firm—Scully, Scott, Murphy & Presser

(57) ABSTRACT

A system is provided for detecting a seal fault in units which include sealed gaseous portions. The system includes an electro-negative tracer gas inserter for inserting an electro-negative tracer gas within the sealed portion of the unit, a gas sampler for sampling a flow of gas proximate the object containing the tracer gas and an electron capture detector connected to the gas sampler for monitoring the gas for the presence of the electro-negative test gas. The system thereby determines a presence or absence of the seal fault in the sealed portion of the unit.

8 Claims, 6 Drawing Sheets

SYSTEM FOR DETERMINING INTEGRITY OF A GAS-SEALED COMPARTMENT

BACKGROUND OF THE INVENTION

1. Field of the Invention

The invention relates generally to apparatus to detect leaks within fluid or gas containing systems. More particularly, the invention relates to a system for testing the integrity of gas-seals constructed within fluid containing apparatus or gas-containing sub-systems within test objects which includes injecting a test gas into the test object, detecting a presence of test gas at or near the object on assumption that same passed through a break in a gas-seal sealing the object/sub-system, and recycling the test gas used.

2. Description of the Related Art

In manufacturing and industry, various components and apparatus are known (referred to herein as "equipment" or "test objects") manufactured as, or to include gas- or fluid-filled subsystems for their normal operation. Of course the seals required by same mentioned components and apparatus are tested before the test object is put in commerce. The accuracy of the testing, i.e., the ability to identify and separate test objects, the seals of which are required intact normal operation is paramount to maintaining consistent quality control standards, and therefore quality of the apparatus known commercially.

The need for accurate and efficient methods for testing gas- or fluid-filled apparatus has facilitated development of dedicated test apparatus and methods to verify the integrity of seals in apparatus requiring same. Conventional apparatus and methods enable a manufacturer or OEM to verify the integrity seals within, for example, refrigeration fluid subsystems under certain test conditions. Prior art seal-testing apparatus use a test gas containing some type of trace molecule or entity used to conduct integrity studies of seals or sealed subsystems within test objects. The gas is injected into the subsystem, and the object is "sniffed" for leaked portions of the test gas.

Conventional gas-seal test equipment attempts to verify the presence of the test gas, usually using spectroscopic equipment, such as an electron capture detector.

For example, U.S. Pat. Nos. 5,317,159, 5,293,130, 3,714,421, 3,892,968, disclose various gas-seal integrity testing apparatus which utilize mass spectrometers. For example, a gas leak detection system 1 of the prior art is shown in FIG. 1 which utilizes pressurized test gas and a mass spectrometer in a method of use known "pressure/accumulation testing" to verify the integrity of seals which seal a gas- or fluid-containing sub-system 2a within a test object 2.

The system 1 includes a mass spectrometer 8 connected to a "sniffer" probe 4. The sniffer probe 4 is constructed in fixed fluid communication with mass spectrometer 8 via a flexible hose or tube 10. The spectrometer includes an ionization chamber to ionize particular gas or gases present in the ionizing chamber. During testing, the subsystem is charged with a helium-containing test gas. Hence, an amount of the test gas injected into the test object must be sufficient to generate a pressure within the test object 2 significantly greater than atmospheric pressure, or one (1) atmosphere (Atm.), to ensure that a sufficient amount of test gas leaks into the atmosphere around the object to be clearly identified by the system 1.

The test object 2 is inserted into testing chamber 6 to which the sniffer probe 4 is attached. Any break or fault in the seal of subsystem 2a provides a path for pressurized test gas (containing the helium) to escape into the testing chamber. The chamber 6 is "sniffed" for helium or traces of helium in a flow of gas drawn into the sniffer from the atmosphere surrounding the test object (inlet 4a) of the sniffer probe. That is, gases near the test object are sucked into the sniffer probe. The sniffed gases pass through hose 10 into mass spectrometer 8. That is, detector 8 verifies the presence of (and/or quantity of) helium in the gas collected, typically in parts per million. Detection of helium is indicative of a leak in the subsystem of the test object being tested.

Pressure/accumulation testing so described is useful for verifying the integrity of seals sealing gas subsystems within large test objects, such as tanks, particularly those including gas-filled sealed compartments of which are not easily evacuated, but are built to withstand stresses generated by large differential pressures, or a leak rate specifications which are strenuous in view of the art. The reader must note that the accuracy of such testing is limited where the sniffer gas sample contains gas leaked from the subsystem. That is, because the "sniffer probe" takes in surrounding air and its adulterants, it cannot be assumed that intaken air has tracer gas even though same indeed leaked from the test object 1. That is, non-metered volumes of atmospheric gases present at or near the test object during testing could also lead to significantly diluted test gas concentrations, and therefore, accuracy of the test.

Vacuum testing is also known, such as vacuum detection system 21 of FIG. 2. Vacuum detection system 21 is shown in the figure to include a helium detector or mass spectrometer 8 connected in fluid communication with a vacuum pumping system 22 by tube or gas conduit 20. Conduit 20 also connects detector 8 and system 22 to subsystem 2A within test object 2. The vacuum pumping system 22 allows the helium detector 8 to operate under high vacuum pressure to evacuate the sealed fluid subsystem 2A during testing. The test requires that a fine spray of helium (which may be contained in a conventional gas tank 28) is directed over the outside of test object 2 using a helium sprayer 24. If a flaw in the seal exists, helium will pass into the subsystem through the flaw induced by the pressure differential. Tube 20 transports the input gas to mass spectrometer 8, where, if helium is detected, a leak is assumed.

An obvious drawback exists in that any gases drawn into the system may contain relatively insignificant or undetectable amounts of helium tracer gas. Hence, detection of helium leaked by the test object will be available in detectable amounts in the sucked-in gases only if the test object 2 is "sufficiently" sprayed, and/or the flaw or leak is "sufficiently" large. So vacuum-testing technology works only as long as helium present in the gas sample is not overly diluted to amounts outside the effective detection ability of the vacuum-based system. A not so obvious drawback to conventional technologies is that the high vacuum pressure utilized in the vacuum test requires mechanical apparatus of substantial size (and maintenance) at the place of testing, which also increases system construction costs.

Shortcomings in conventional vacuum testing, and/or accumulation-pressure testing technology led to yet another conventional leak detection system 31 which utilizes a combination of the pressure and vacuum testing technologies (FIG. 3). System 31 includes a mass spectrometer 8 and a vacuum chamber 34 attached to the spectrometer via gas conduit. Conduit 20 is also connected at its other end to a vacuum pumping system 22. To use system 31, the user must first use a gas injection means (not shown in the figure) to inject a test gas into the closed space or sealed gas-filled subsystem within test object 30 which is to be tested. Helium is injected into object 30 to generate an internal gas pressure greater than one atmosphere. The helium-pressurized test object 30 is placed within test chamber 34. The test chamber 34 is evacuated to less than atmospheric pressure via vacuum pumping station 22. This process results in a reduction of helium concentration contained within air filling the chamber to a helium concentration significantly below that normally found in air. The accuracy of the leak detection is improved in kind.

Hence, if a flaw allowing gas leakage from the sealed subsystem of the test object exists, the pressurized helium will leak from same to be detected as the gas from the chamber 34 is drawn into the mass spectrometer 8 via hose 20. While less severe than the technologies described above, it should be noted leak detection apparatus designed after system 31 subjects the test object to both vacuum pressure (less than one atmosphere) externally, and to greater than atmospheric pressure (about 1 atmosphere). Many objects which require seal-testing cannot withstand this type of testing. Additionally, generating such testing conditions requires the use of substantially sized mechanical apparatus, which apparatus must be calibrated and maintained regularly for proper operation. A final drawback of such a conventional system is that its continued use over time results in leakage of considerable amounts of helium (or other conventional test gases) into the environment which in time could result in detectable environmental change.

A need, therefore, exists for a device and/or system for accurate testing of the integrity of fluid or gas seals, whether the object is a gas- or a liquid-flow system, or a similar subsystem in an object which requires accurate seal-integrity testing. The "seals" be tested would, preferably, tested by such a system with a low internal to external pressure differential, i.e., greater than four-fifths (0.80) atmospheres internal, and less than one and one fifth atmosphere (atms.) external, assuming atmospheric pressure is exactly one atmosphere) in order to minimize potential harm resulting from such pressures.

A further need exists for a device and/or system capable of testing the integrity of a gas seal required for operation of a test object, wherein detected presence of tracer gas, e.g., helium or other detector gases is detectable in amounts as minimal as parts per trillion.

A still further need exists for a leak detection apparatus which effectively detects a particular tracer gas and where the tracer gas is detectable in such minute amounts that it is possible to significantly dilute an amount of tracer gas needed for testing. The system also, preferably, includes an apparatus for recycling the tracer gas needed for accurate testing of test objects. A commensurate drop in cost for testing under the circumstances could be anticipated.

SUMMARY OF THE INVENTION

Hence, it is an object of this invention to provide an apparatus and a method for testing the integrity of seals within gas-containing test objects or subsystems within same the integrity of which must be tested which overcomes the shortcomings of the prior art.

And in accordance with the principles of the invention, a system and/or apparatus is disclosed which detects leaks or faults within gas- or fluid-containing compartments or subsystems in objects under test, utilizing electronegative trace gases. Hence, the system of this invention detects, and if present, measures, amounts of electronegative gases which have escaped from the gas- or fluid-filled objects, compartments or subsystems of objects under test. Detection by the system requires use of an electron-capture detector which has a capacity to detect minuscule amounts of electronegative tracer gases within test gas gathered from about a test object. The system also includes a gas transport mechanism or subsystem that is in fluid communication with the electron capture detector, and a gas-dilution system for diluting or minimizing an amount of eletro-negative tracer gas used because of the increased delectability of the system over those of the prior art, and processing electronics enabling same. Preferably, the system includes a gas mixer for combining or commingling and mixing amounts of control gas with the tracer gas to realize a test gas for use at lower concentrations with vary for various testing applications.

Applicants' invention uses combinations of particular features of conventional leak-detection technologies including pressure-accumulation testing, vacuum testing, and/or various combinations thereof. The unique sampling apparatus of this invention provides that a test object be charged with test gas (containing electron negative tracer gas). A large pressure differential is not required to carry out accurate testing with the present invention, that is, the invention operates effectively without the need for generating an extreme pressure differential between outer environment and inner sealed test-gas containing compartment or conduit. The test gas will leak from the object into the environment surrounding same if leaks or compromises exist in seal.

The system intakes gas samples (which may or may not contain amounts of the electronegative test gas) which are passed by the system's gas-transport system into a gas detection instrument, or electron capture detector. Preferably, however, collected or sampled gases are pre-processed by the system to remove oxygen, etc., by combining the collected gas sample with a metered amount of hydrogen, etc.. The hydrogen reacts with oxygen present in the collected gas, forming water vapor, which may then be removed by permeation drying means. Decreasing oxygen content greatly enhances the ability of the gas detection system to accurately monitor the test or tracer gas. If tracer gas is detected in the gas under test, a leak is assumed. Preferably, a flow control apparatus is included in the system to evacuate the gas volume contained by the system after testing to retrieve or recycle used tracer gases and prevent same from being released into the environment. The system is, therefore, able to perform a gas recovery operation which is not only cost efficient, but environmental friendly as well.

The leak detection system of the present invention may be operated as a stand alone "sniffer", or can be integrated into a leak test station with other processing and/or quality control equipment. During operation as a stand alone "sniffer", operation proceeds as described above where the test object is injected an with a test gas with electronegative tracer, and then probes the area at or near the test object for leakage of same. Alternatively, a flow of neutral gas may be directed across the test object and into the system. Test gas leakage from the object is caught up in the gas flow and thereby sniffed by the system.

Alternatively, the system may be combined with an accumulation chamber, within which the test object is placed under test. Accordingly, the system accumulates test gas leaking over time, thereby increasing the sensitivity of the testing performed. Process electronics and software which may drive same converts signals generated within the electron capture detector into a leak rate value for use by the testing technician or other electronics device connected thereto, in parts per trillion in the accumulation chamber.

BRIEF DESCRIPTION OF THE DRAWINGS

Preferred embodiments of the system, apparatus and method of this invention are described in detail herein with reference to the following drawings, wherein.

DETAILED DESCRIPTION OF PREFERRED EMBODIMENTS

Figure 1:
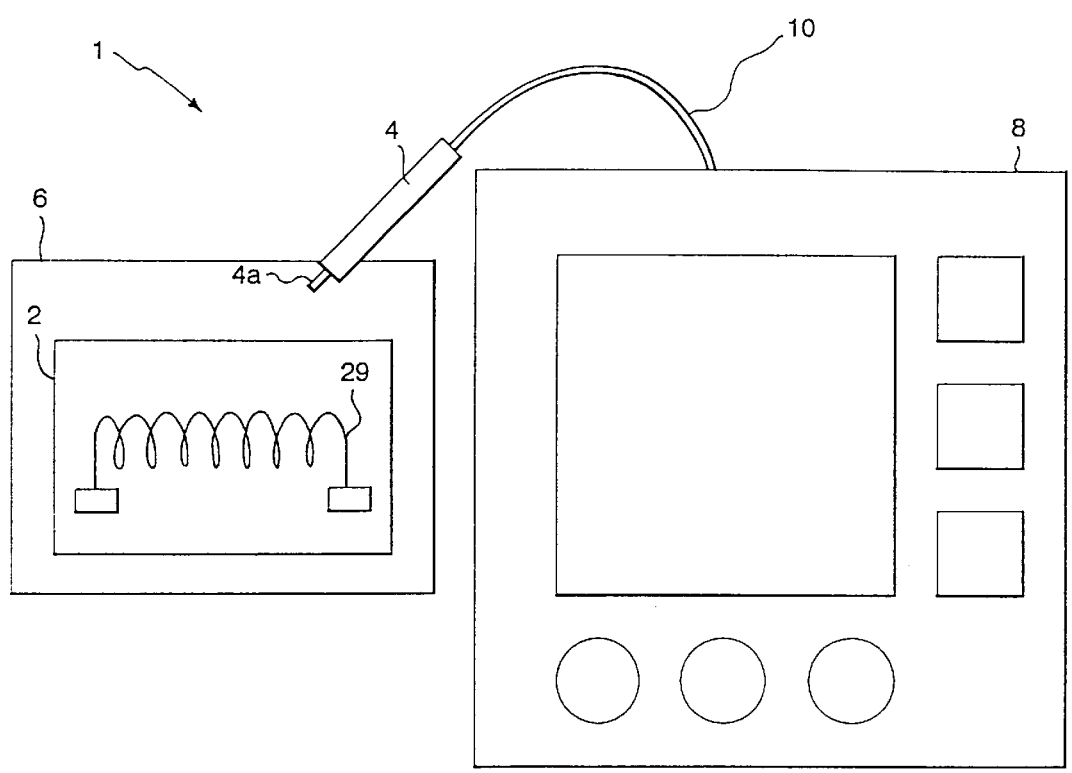
FIG. 1 is a prior art schematic of a leak detection system using pressure testing.
Figure 2:
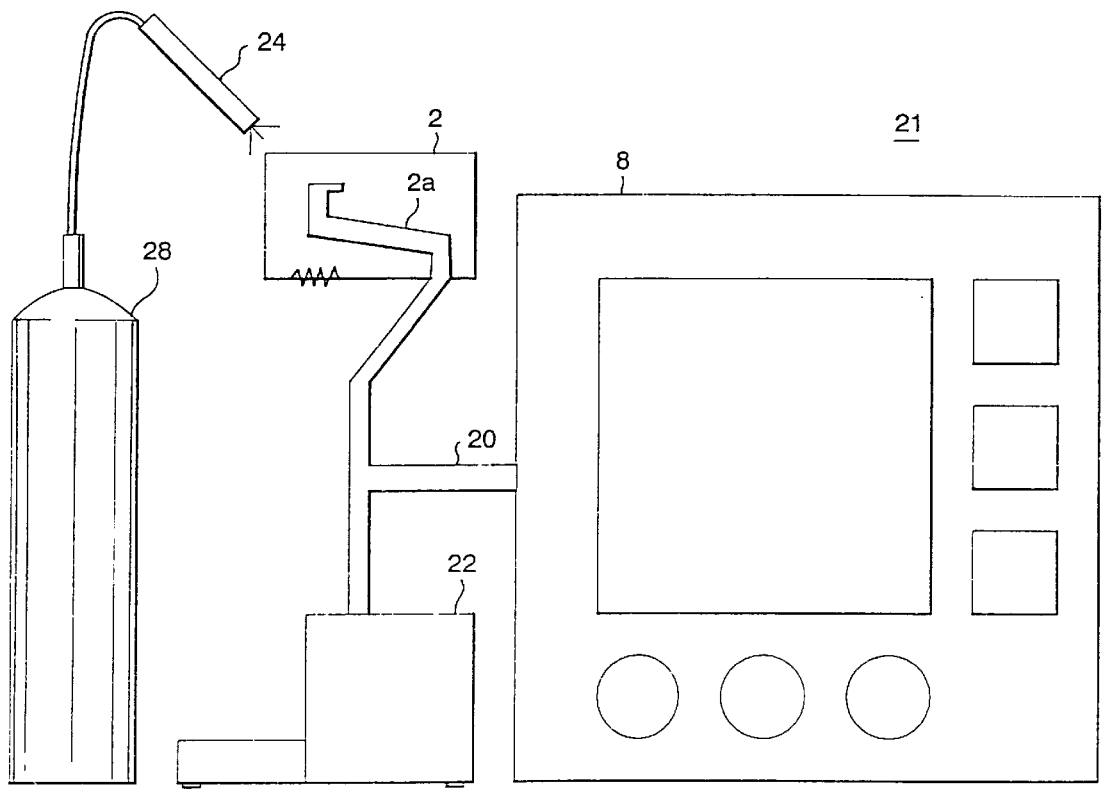
FIG. 2 is a prior art schematic of a leak detection system using vacuum testing.
Figure 3:
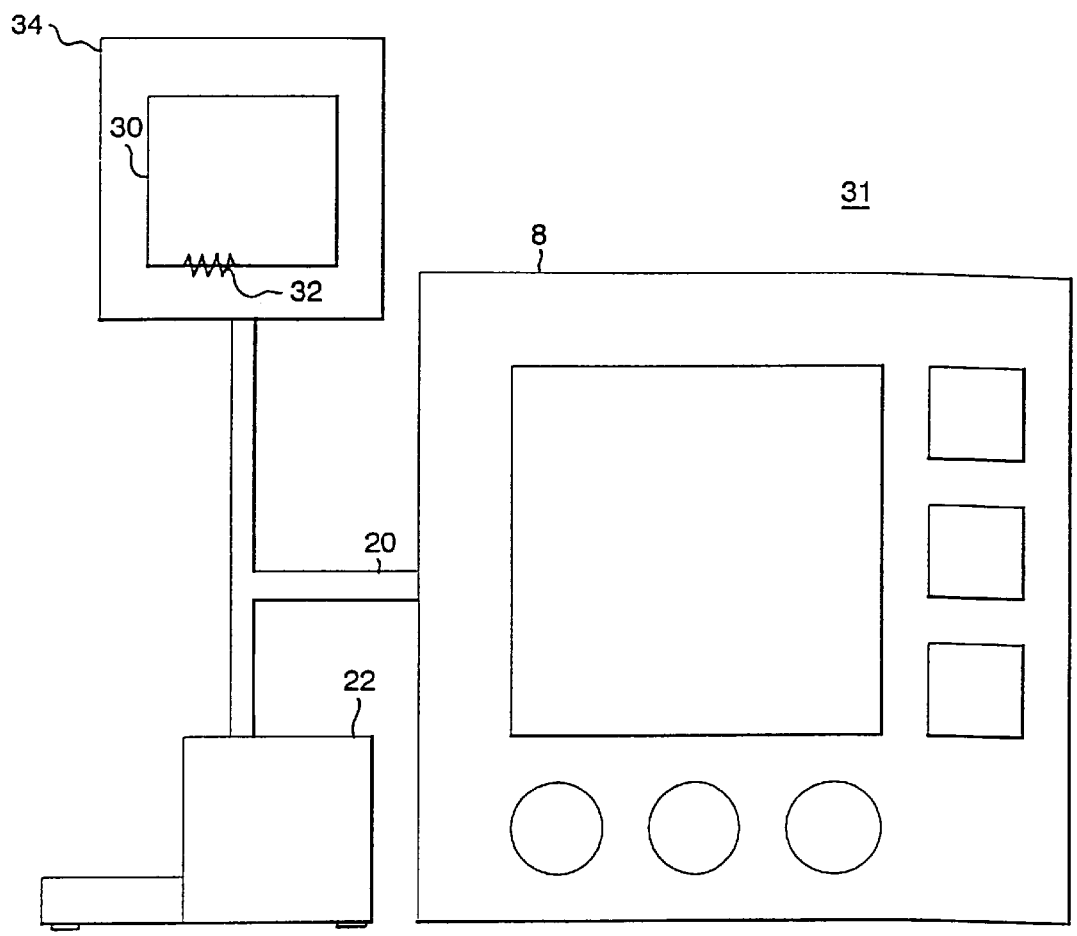
FIG. 3 is a prior art schematic of a leak detection system showing a combination of pressure and vacuum testing.

Electron capture detectors are known for detecting traces of various compounds through appropriate calibration, particularly those electron capture detectors which employ ionization chambers. Processing electronics connected to the ionization chamber detect minute current variations in signals passed through same as a result of capture of free electrons by the trace element to be detected. Variations on the pulsing scheme are known to result in variations on detection ability, particularly those using sulfur hexafluoride as the trace element, as does this invention.

Electro-negative tracer or tagging gases are selected for use in this invention, as recited in the claims appended hereto, because of their strong attraction to free electrons and their chemical stability. Sulfur hexafluoride ($SF_6$) and other perfluorocarbons are utilized herein because of their chemical stability at high temperature, chemically inertness, and non-toxicity. For that matter, the invention is able to effectively detect leaks in test objects where pressure differentials created between the inner and outer atmosphere are less than one tenth of one atmosphere, as in detection system 40 shown in FIG. 4.

A first embodiment of the leak detection system 40 of this invention will now be described with reference to FIG. 4. Leak detection system 40 comprises a gas input device 44 for receiving a gas sample drawn from a unit under test or test object. A sealed gas/fluid compartment or subsystem within test object 42 is first charged with a test gas containing a specific amount of $SF_6$ or other perfluorocarbon. It should be noted that test object 42 is not part of the invention but includes a gas-filled subsystem under test not explicitly shown in FIG. 4. The test object 42 is placed in a directed, continuous gas flow or stream. Gas from the area about the test object 42 is thereby drawn into the system through device 44.

Gas input device 44 is connected to a mass flow meter 46 which measures the volume and rate of flow of the gas drawn into the system and to a hot bed catalyst 50. Hydrogen gas is provided to the metered gas sample from tank 49 via a flow controller 48 to precipitate removal of free oxygen from the gas sample to generate water vapor. Regulation by flow controller 48 of the amount of hydrogen to be mixed with the gas sample in the hot bed catalyst 50 assures that all oxygen is removed without leaving excess hydrogen. The gas sample is dried in a permeation dryer column 52 to remove the water vapor. After drying, the gas metered, dried gas sample is directed to a electron capture detector 54. Vacuum pump 56, together with a flow control valve 58 control gas flow through the electron capture detector 54. Process electronics (not shown in the drawing figure process signals generated by electron capture detection of $SF_6$ into a leak rate value. Hence, sulfur hexafluoride found in the gas sample is assumed to result from a leak or fault in the seal sealing the gas-filled subsystem of test object 42.

Figure 4:
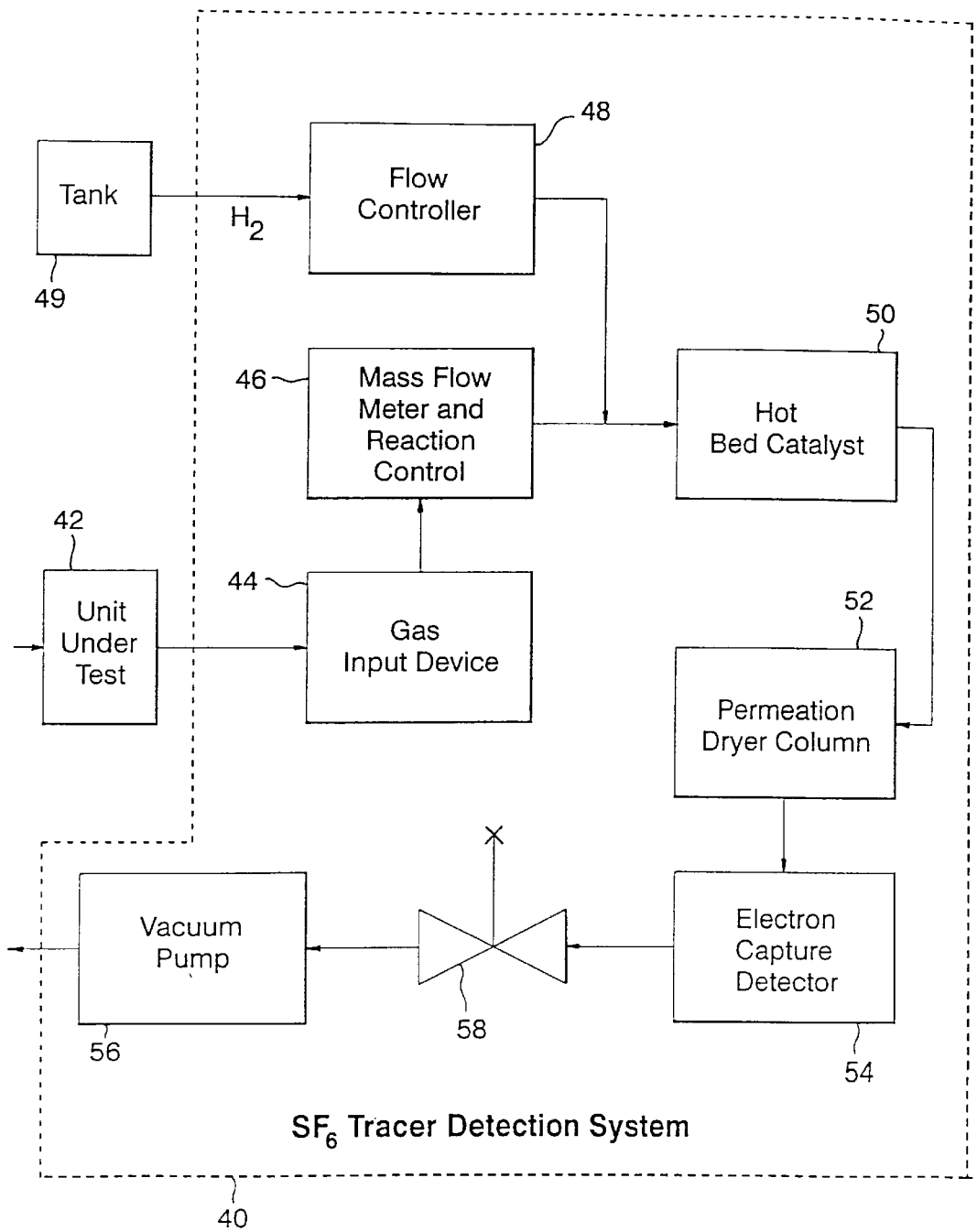
FIG. 4 is a schematic diagram of one embodiment of a leak detection system of the invention.

Flow sampling of the present invention, as mentioned with regard to FIG. 4 may also be carried out where the test object is inserted in a test chamber 60 in fluid communication with gas input device 44 of system 61. Of course the test object 42 is placed with chamber 60 for testing. A gas mixing station 64 may also be included with the invention for mixing $SF_6$ (in tank 62) and tracer free air (in tank 63) to form a test gas for injection into test object 42. Such an arrangement renders accurate and may very well reduce the amount of $SF_6$ needed for testing by the system 61. Any leaked test gas is retained within chamber 60 and is allowed to build to a detectable amount during the time the test object 42 is left therein. The sensitivity of the devices' detection ability, as well as quantity of tracer gas detected increases as a function of time.

Figure 5:
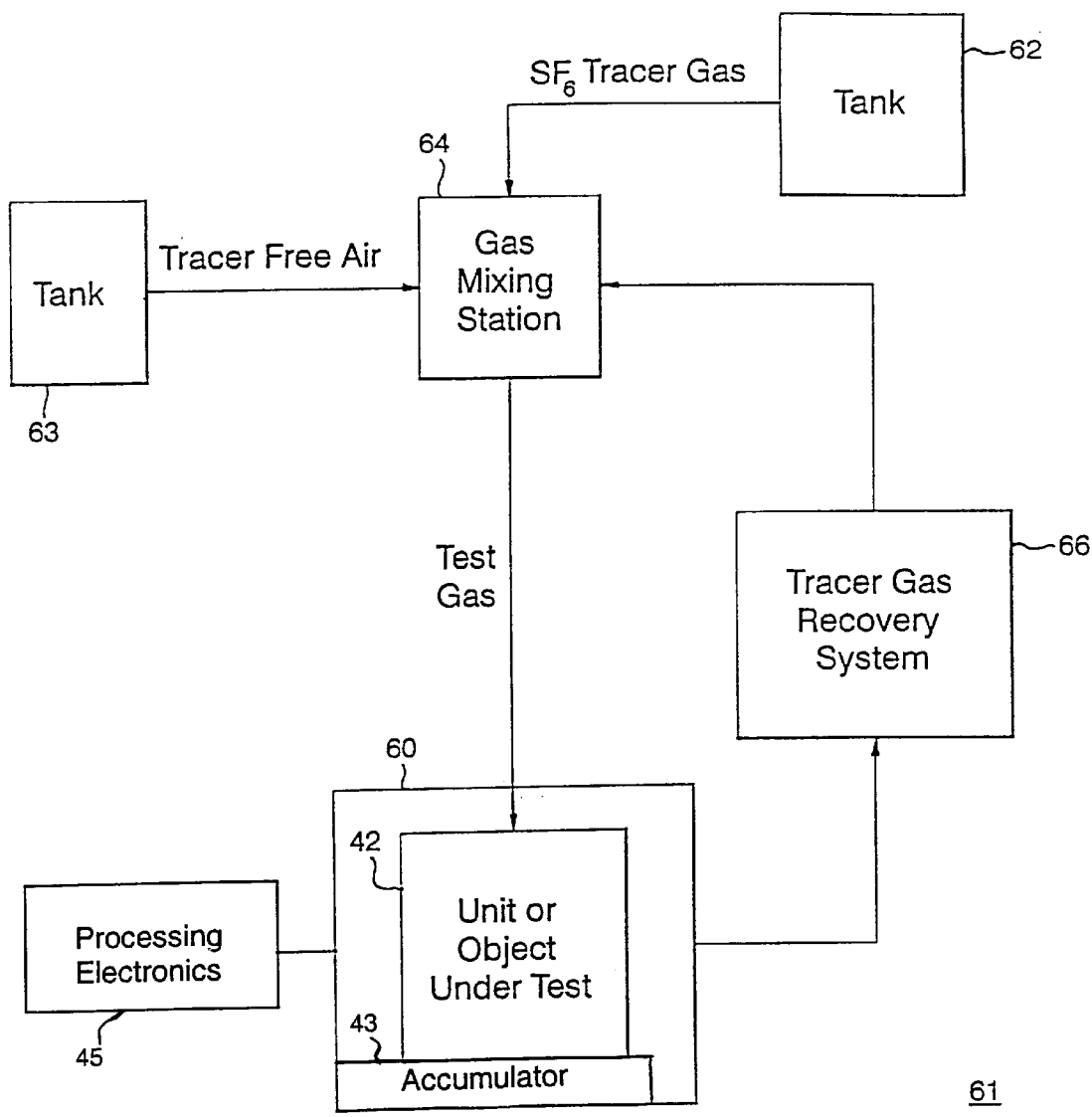
FIG. 5 is a schematic diagram of an alternative to the embodiment shown in FIG. 4.

Any detected increase in levels of the tracer gas within the test gas in the chamber is identified by the station's process electronics (not shown in FIG. 5). The process electronics may be microprocessor controlled or hard wired. If microprocessor controlled, computer instructions are included within a memory device (not shown in FIG. 5) accessible by the microprocessor to carry out conversion of data representing the measured amounts of tracer gas. In that way, leak rate values are generated, i.e., how much leakage there is over any given period of time. These values are communicated to the user to determine "detection" levels of same.

Also shown in FIG. 5 is tracer-gas recovery system 66 attached to test chamber 60. An accumulator 43 is provided within test chamber 60, and is connected to processing electronics 45. Within recovery system 66, the system recovers the tracer gas from the test gas sample after testing (sampling) is carried out. The tracer gas recovery system 66 transfers the test gas sample into mixing station 64, where it is recovered/recycled for again mixing into a known test gas sample for injection into the test object 42. The mixing station 64 may be utilized for both sniffer testing and accumulation testing.

With the additional features of FIG. 5, the detector system's sensitivity may be adjusted by mixing the tracer gas with tracer-free gas (concentrating/diluting), which enables testing to be carried out in gas mixture percentages, typically, equal to the ratio of the two flow rates of gas entry into mixing station 64. Such increased sensitivity extends the usable range of tracer concentrations in test gas, and therefore, tests larger leaks without exhausting and releasing excessive amounts of tracer gas.

Figure 6:
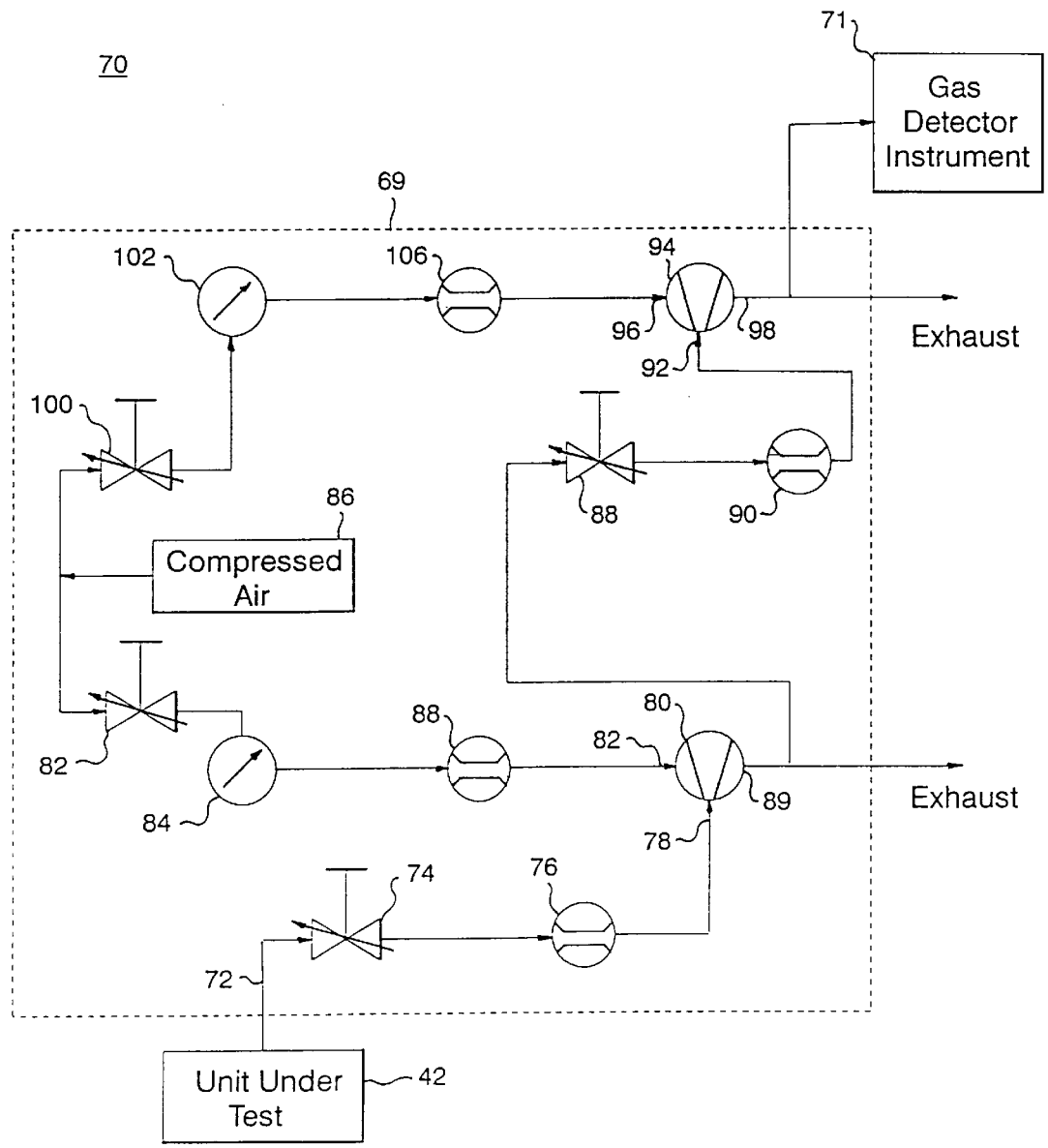
FIG. 6 is a schematic diagram of a 2-stage diluter which may be incorporated within the system of the present invention described with reference to FIGS. 4 and 5.

FIG. 6 shows a leak detector system 70 of this invention which recycles test gas used in testing and includes a the two-stage diluter 69. The system 70 includes two-stage diluter, 69 the gas detector instrument 71, and a port 72 to connect the system to a test object 42. The two-stage diluter 69 receives a test gas sample from the test object by drawing the sample into port 72 through a manual throttle valve 74 to an input port 78 of first venturi vacuum pump 80 via first flow meter 76. The exact amount of the test gas sample brought into the system, as well as its flow rate, may be monitored thereby.

Compressed air 86 may be mixed with the test gas drawn into pump 80 to dilute the amount of $SF_6$ that flows into gas instrument 71. The amount of compressed air is controlled by adjustments to second manual throttle valve 82. And a first pressure gauge 84 communicates the pressure potential at which the compressed air is maintained. A second flow meter 86 monitors flow rate of the compressed air into port 82 of first venturi vacuum pump 80. The test gas sample is therefore mixed by the system 70 and via port 89 of the first venturi pump 80. The output from pump 80 is directed by a third manual throttle valve 88 and through a third flow meter 90 to a first port 92 of a second venturi vacuum pump 94. The addition of same within the system allows for the further dilution by compressed air from container 86 via a fourth manual throttle valve 100, a second pressure gauge 102, and a fourth flow meter 106, thereby diluting test samples processed by the system in two stages.

Two-stage diluter 70 utilizes the venturi vacuum pumps to both draw the sample from the test gas flow and to provide dilution to the test gas based thereon. The venturi pumps operate by forcing compressed air through a conical shaped nozzle. For example, to achieve a particular dilution ratio, compressed air flow may be arranged to take place at 100 cc/sec via throttle valve 74. The sample line may then be set to 1 cc/sec, via throttle valve 88, resulting in a ratio of air to tracer gas of 100 to 1. To avoid "starving off" the instrument sample line, the sum of both the compressed air and the sample test gas flow should always be greater than the gas flow required by the leak detector instrument 71.

An exit port 98 of pump 90 creates a vacuum which exhausts gases. During operation, a sample of test gas is drawn into the system 70 from test object 42. The gathered gas is mixed, in a two-stage dilution process, with compressed air and supplied to the electron capture detector. Throttle valves are preferably implemented as needle valves. To ensure constant equal pressure, the pressure gauges and flow meters are disposed in series connection between the compressed air source and venturi pumps. The second dilution is accomplished within the second venturi pump 94. Pump 94 and meter 106 are included to ensure constant and accurate metered amounts of compressed air. The test gas output from the exhaust port 98 of venturi pump 94 is the actual test gas sample provided to the gas-detector instrument 71 for analysis Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A system for detecting a fault in sealed gas-containing portions of objects under test (test objects), comprising:

means for inserting an electro-negative tracer gas within the sealed gas-containing portion of said test objects;

gas capture means for drawing gases present around the test object for sampling the system, said gas capture means including elimination means to substantially eliminate oxygen from the gas sample before processing the gas sample in an electron capture detector;

an electron capture detector connected to the gas capture means for monitoring the drawn gas sample for a detectable presence of electronegative tracer gas in the sample leaked from the fault, wherein said elimination means utilizes a hot bed catalyst to removed unwanted gases from said sampled gas.

2. The system of claim 1, wherein said hot bed catalyst contains hydrogen to react with free oxygen present in the gas sample.

3. The system of claim 2, wherein said elimination means utilizes a permeation dryer to remove water from said sampled gas.

4. A system for detecting leaks within a sealed test object, whereby the sealed object includes a sealed internal volume, a seal of which must be verified, comprising:

a test chamber within which the test object is disposed for testing;

electro-negative tracer gas insertion means for inserting a test gas containing an electro-negative tracer gas into the internal volume of the test object, an accumulator disposed within the test chamber which accumulates an amount of tracer gas with an amount of test gas leaked from the test object in the test chamber over time, including elimination means for eliminating oxygen from test chamber test gas samples;

an electron capture detector in fluid communication with the accumulator for monitoring test chamber test gas samples to quantify a leaked amount of said electro-negative tracer gas, wherein said elimination means includes a hot bed catalyst.

5. The system of claim 4, wherein said hot bed catalyst includes hydrogen to react with said oxygen.

6. The system of claim 5, wherein said elimination means includes a permeation dryer.

7. A method for detecting leaks in an internal compartment within a test object, comprising the steps of:

inserting an electro-negative tracer gas within said internal compartment of said object while under test, said electronegative tracer gas first diluted with a predetermined amount of tracer-free gas;

enclosing said test object within a sealable testing chamber;

creating a gaseous detection environment within said chamber, said environment substantially surrounding said test object;

sampling a test gas from said gaseous detection environment; and monitoring said sampled test gas for detectable amounts of said electro-negative tracer, wherein the presence of a predetermined amount of tracer gas indicates a fault in the sealed internal compartment, and wherein said step of monitoring includes combining a predetermined amount of hydrogen to said sampled test gas in the presence of a hot bed catalyst.

8. The method of claim 7, wherein said monitoring further includes permeation drying said sampled test gas prior to performing said monitoring.

* * * * *